No. 717,122.  
A. ROESCH.  
PRESSURE GOVERNOR.  
(Application filed Jan. 2, 1902.)  
Patented Dec. 30, 1902.
(No Model.)  
2 Sheets—Sheet 1.
Fig. 2.
Fig. 3.
Fig. 1.
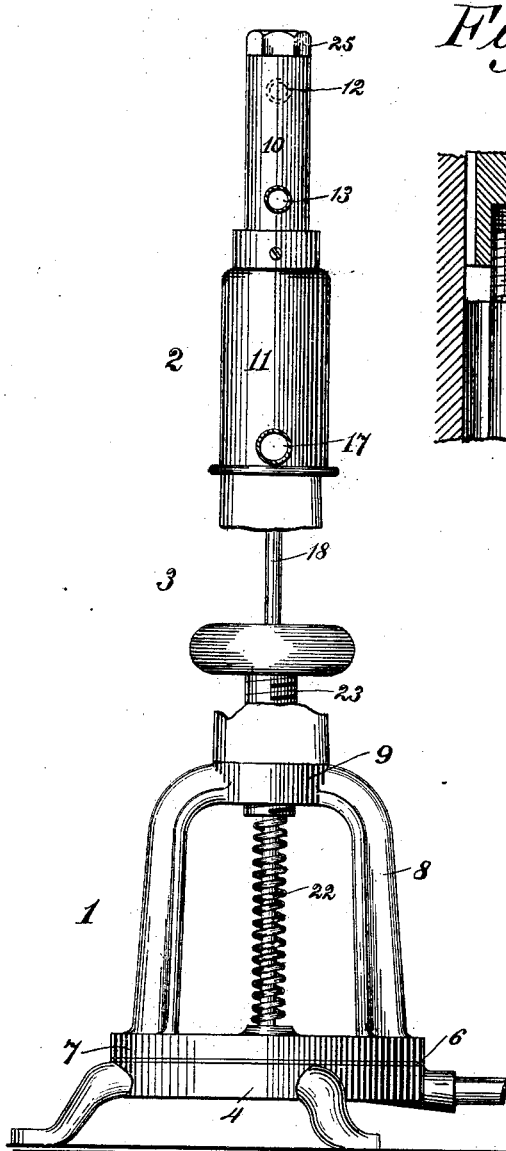
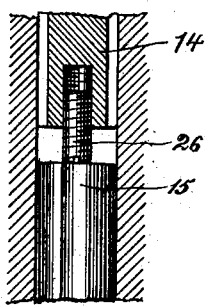
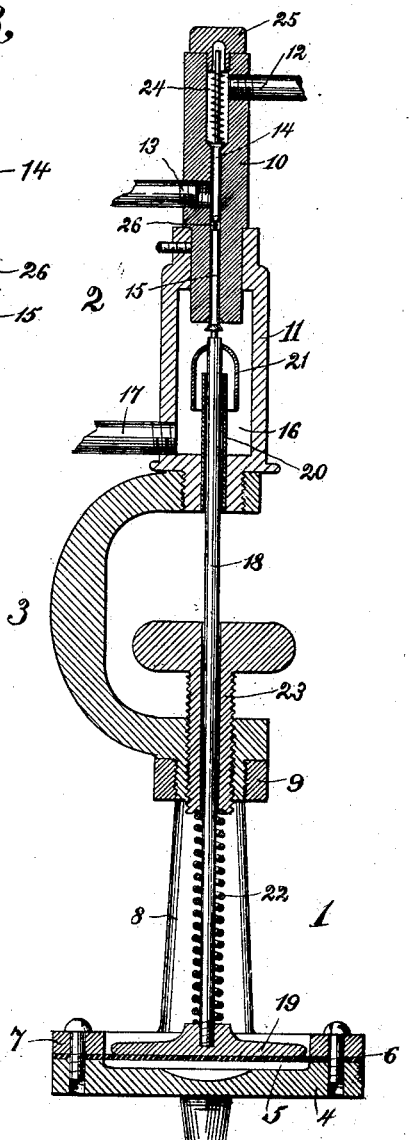
WITNESSES:
C. F. Carrington
M. M. Conover
INVENTOR
Alfred Roesch
BY
James B. Dver
ATTORNEY

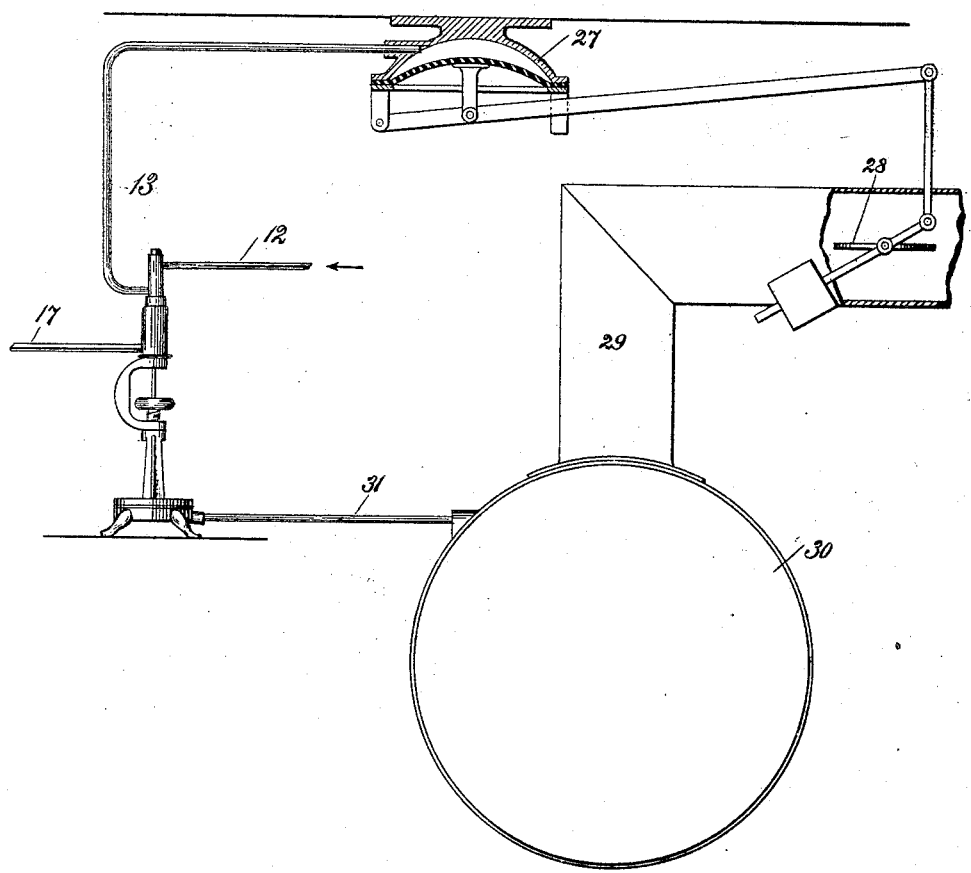

UNITED STATES PATENT OFFICE.

ALFRED ROESCH, OF BRIDGEPORT, CONNECTICUT, ASSIGNOR TO DAVIS & ROESCH TEMPERATURE CONTROLLING COMPANY, OF NEW YORK, N. Y., A CORPORATION OF NEW JERSEY.

PRESSURE-GOVERNOR.

SPECIFICATION forming part of Letters Patent No. 717,122, dated December 30, 1902.

Application filed January 2, 1902. Serial No. 88,034. (No model.)

*To all whom it may concern:*

Be it known that I, ALFRED ROESCH, a citizen of the United States of America, and a resident of Bridgeport, in the county of Fairfield and State of Connecticut, have invented certain new and useful Improvements in Pressure-Governors, of which the following is a specification, reference being had to the accompanying drawings, forming a part thereof.

My invention relates to improvements in pressure governors or regulators, and particularly to that class of governors or regulators in which variation in pressure will itself operate to automatically control the means by which said pressure may be regulated, such governors or regulators being used in connection with heating systems, reducing-valves, and the like. In the present form of my invention such means comprises a damper arranged in a flue rising from a heater and an operating means for moving the damper, consisting of a fluid-pressure-operated motor and valve mechanism for controlling the motive fluid therefor. The present invention is comprised principally in the valve mechanism and in the coacting parts. The valve-chamber is provided with an inlet-port and a distributing-port, and an inlet-valve is fitted thereto for controlling communication between said inlet-port and said distributing-port, and a discharge-valve is also provided for controlling the discharge from said distributing-port. Both the said valves and their stems are contained wholly within the valve-chamber, and the said valves are operated from the discharge side of the discharge-valve by a rod which is arranged between the said discharge-valve and the movable wall of a pressure-chamber. By said arrangement the use of a stuffing-box or analogous device becomes unnecessary, and the operating-rod of the pressure-chamber is permitted an entirely unobstructed movement.

I have provided a means for preventing the escape of fluid from the valve-chamber at the point at which the operating-rod of the pressure-chamber penetrates same for the purpose of engaging the valves. Such means herein comprises an uprising-tube which surrounds the rod at and above the said point of penetration and an annular liquid-deflector secured to the rod at a point above the said tube. Liquid discharged through the discharge-valve will be deflected by the said deflector and will be carried away through a suitable discharge-pipe provided, and escape from the valve-chamber except through such discharge-pipe will be prevented.

The main object of my invention is to increase the sensitiveness of pressure governors or regulators of this description by dispensing with stuffing-boxes or other devices which involve frictional contact upon the operating-rod.

Further objects of my invention are to simplify the parts and to reduce the cost of construction and maintenance of a device of this description.

My invention further consists in certain details of construction and combination of parts, as shall hereinafter be more fully set forth, and other advantages will appear hereinafter.

I will now proceed to describe a pressure governor or regulator embodying my invention and will then point out the novel features in claims.

With reference to the drawings, Figure 1 is an elevation in central vertical section of a governor or regulator embodying my invention. Fig. 2 is a side elevation of the same, a portion of the frame being broken away in order to disclose other parts. Fig. 3 is an enlarged detail section of a portion of the valve-chamber and a portion of the inlet and discharge valves therein. Fig. 4 is a diagrammatic view illustrating a system in which my regulator or governor may be employed.

The governor or regulator herein illustrated as an embodiment of my invention comprises three sections united together—a lower section 1, which includes the pressure-chamber, an upper section 2, which comprises the valve-chamber, and an intermediate section 3, which connects the sections 1 and 2 together.

The section 1 comprises a base 4, having a chamber 5 therein, which is inclosed by diaphragm 6. A ring 7 is secured to the base 4, and the diaphragm 6 is secured in position between the said ring and the said base. Spider-arms 8 rise upwardly from the ring 7 and support a hub 9, which receives one end of the intermediate section 3.

The section 2 is made up of two separate members 10 and 11. This, however, is merely for convenience of manufacture, and for the purposes of this specification they may be considered as being all one part. The member 10 has an inlet port or passage 12 and a distributing port or passage 13. An inlet-valve 14 is fitted to the chamber between the inlet-port and the distributing-port, and a discharge-valve 15 is fitted to the chamber upon the opposite side of the distributing-port and controls the discharge. The valve 15 discharges into a chamber 16, formed in the member 11, from which a port or passage 17 leads to exhaust.

An operating-rod 18, provided at its lower end with a follower 19, is arranged between the diaphragm 6 of the pressure-chamber and the discharge side of the discharge-valve 15. The follower and the diaphragm 6 constitute the movable wall of the pressure-chamber. The operating-rod penetrates the valve-chamber through the lower wall of the lower member 11 thereof, and a tube 20, fitted to the chamber and projecting upwardly within same, surrounds the said rod at or above the point at which the said rod enters the chamber. The operating-rod is further provided with a liquid-deflector 21, which is secured thereto at a point above the said tube.

A spring 22 is arranged between the movable wall of the pressure-chamber and a stationary part of the device, and, as herein shown, the said spring surrounds the lower end of the operating-rod and at one end bears against the follower 19 and at the other against an adjusting-nut 23. By manipulation of the adjusting-nut 23 the tension of the spring may be adjusted as may be desired, and the governor or regulator may hence be caused to operate at the desired point of fluid-pressure within the pressure-chamber. A light coil-spring 24 is arranged between the upper end of the inlet-valve 14 and a cap 25, with which the upper end of the valve-chamber is closed, the said springs tending normally to seat the valve 14. The inner ends of the valves 14 and 15 are in contact with each other, and I have provided an adjusting-screw 26, in screw-threaded engagement with one of said valves and bearing against the other, in order to adjust the amount of opening possible for either of the said valves. The adjusting-screw 26 will be so adjusted that when either one of the valves is closed the other valve will always be open. In the position in which the parts are illustrated herein the inlet-valve 14 is closed, and consequently the discharge-valve 15 is opened. When pressure rises in the pressure-chamber 5, so as to further overcome the tension of the spring 22, the discharge-valve 15 will be closed, while the inlet-valve 14 will be opened. When this takes place, liquid under pressure, which enters through the port or passage 12, will be permitted to pass to the distributing-port 13.

Referring now to Fig. 4 and which shows one form of apparatus with which my invention is adapted to be employed, it will be seen that the distributing port or passage 13 may lead to a motor 27, such motor controlling the position of a damper 28, arranged in the uptake 29 of a heater 30. A connection 31 is shown which may connect the fluid under pressure in the heater 30 with the pressure-chamber 5 of the governor or regulator. The liquid under pressure flowing through the port or passage 12 and the port or passage 13 to the motor 27 will operate the said motor so as to change the position of the damper 28. Upon a reduction of pressure in the pressure-chamber 5 the spring 22 will lower the operating-rod 18 and permit the inlet-valve 14 to close under the tension of the coil-spring 24. This will open the discharge-valve 15, and the liquid from the motor 27 will be returned through the distributing port or passage 13 to the valve-chamber and discharged through the valve 15 into chamber 16 and out through the discharge or exhaust 17. The deflector 21 and the tube 20 will prevent the escape of fluid from the valve-chamber except through the discharge 17. By this arrangement of inlet and discharge valves and by the provision of the means for preventing the escape of liquid from the valve-chamber except through the discharge 17 without friction or contact with the sides of the rod an extreme delicacy of operation is attained. It is understood that the rod 18 passes freely through the nut 23 without bearing against it at any point.

It will be understood, of course, that I do not want to be limited to the precise construction or combination of parts herein shown, as the same may be varied within wide limits without departing from the spirit or scope of my invention, and it will further be understood that the application of the regulator or governor as illustrated in Fig. 4 is but one of the many uses to which my invention may be applied.

What I claim is—

1. In a regulator, the combination with a valve-chamber having an exhaust-port, and a valve in said chamber for permitting or preventing discharge to said exhaust-port, of an operating-rod arranged with one portion thereof within said valve-chamber, and another portion thereof without same, said rod located beneath the said valve and engaging same, means located without said valve-chamber for operating said rod, and an annular liquid-deflector carried by said rod within said valve-chamber, the exhaust-port in said valve-chamber located at a point below the level at which liquid would discharge through the opening through which the said rod penetrates the valve-chamber, and the liquid-deflector arranged to deflect exhaust liquid away from the said opening, toward the exhaust-port.

2. In a regulator, the combination with a valve-chamber having an exhaust-port, and a valve in said chamber for permitting or preventing discharge to said exhaust-port, of an operating-rod arranged with one portion thereof within said valve-chamber and another portion thereof without same, the said rod engaging said valve, a tube surrounding said rod, and secured within said valve-chamber to the bottom thereof, and extending upwardly to a point above the point of exhaust from said chamber, means located without the valve-chamber for operating the said rod, and an annular liquid-deflector secured to said rod above said tube, and adapted to deflect exhaust fluid into the annular space formed by the tube and the valve-casing.

3. In a regulator, the combination with a pressure-chamber having a movable wall, of a valve-chamber having an exhaust-port, and a valve in said chamber for permitting or preventing discharge to said exhaust-port, a rod arranged with one portion thereof within the said valve-chamber, and another portion thereof without same, said rod located beneath the said valve and engaging same and said movable wall, means located without said valve-chamber for operating said rod, and an annular liquid-deflector carried by said rod within said valve-chamber, the exhaust-port in said valve-chamber located at a point below the level at which liquid would discharge through the opening through which the said rod penetrates the said valve-chamber, and the liquid-deflector arranged to deflect exhaust fluid away from the said opening, toward said exhaust-port.

4. In a regulator, the combination with a pressure-chamber having a movable wall, of a valve-chamber having an exhaust-port, and a valve in said chamber for permitting or preventing discharge to said exhaust-port, a rod arranged with one portion thereof within the said valve-chamber, and another portion thereof without same, said rod engaging said valve and said movable wall, a tube surrounding said rod, and secured within said valve-chamber to the bottom thereof, and extending upwardly to a point above the point of exhaust from said chamber, and an annular liquid-deflector secured to said rod above said tube, and adapted to deflect exhaust fluid into the annular space formed by the tube and the valve-casing.

5. In a regulator, the combination with a valve-casing having two valve-seats, of two oppositely-opening valves fitted to said casing to engage said seats and arranged in line with each other, and an adjustable screw, fitted to one valve and engaging the other, substantially as and for the purpose set forth.

ALFRED ROESCH.

Witnesses:
A. H. PERLES,
C. F. CARRINGTON.